United States Patent [19]

Egawa et al.

[11] Patent Number: 5,548,459
[45] Date of Patent: Aug. 20, 1996

[54] FLOATING MAGNETIC HEAD

[75] Inventors: Motoji Egawa; Tetsuji Fujita; Akinobu Sano; Kazutoshi Takayanagi, all of Shizuoka-ken, Japan

[73] Assignee: Minebea Co., Ltd., Nagano-ken, Japan

[21] Appl. No.: 390,947

[22] Filed: Feb. 21, 1995

Related U.S. Application Data

[63] Continuation of Ser. No. 158,279, Nov. 29, 1993, abandoned.

[30] Foreign Application Priority Data

Dec. 14, 1992 [JP] Japan ................................. 4-353664
Dec. 25, 1992 [JP] Japan ................................. 4-359659

[51] Int. Cl.$^6$ ..................................................... G11B 5/60
[52] U.S. Cl. ................................................................. 360/103
[58] Field of Search ................................. 360/102, 103, 360/104

[56] References Cited

U.S. PATENT DOCUMENTS

| | | | |
|---|---|---|---|
| 3,229,268 | 1/1966 | Solyst ........................................ | 360/103 |
| 4,393,428 | 7/1983 | Fujimura ................................... | 360/125 |
| 4,488,195 | 12/1984 | Yanagiuchi et al. ..................... | 360/125 |
| 4,682,254 | 7/1987 | Hashimoto et al. ..................... | 360/125 |
| 4,711,018 | 12/1987 | Matsuzawa ............................... | 360/125 |
| 4,745,507 | 5/1988 | Otomo et al. ............................ | 360/123 |
| 4,870,520 | 9/1989 | Shaw ......................................... | 360/103 |
| 4,870,521 | 9/1989 | Okabayashi ............................... | 360/103 |
| 4,894,742 | 1/1990 | Saito et al. ............................... | 360/126 |
| 4,918,555 | 4/1990 | Yoshizawa et al. ..................... | 360/125 |
| 5,021,910 | 6/1991 | Murakami ................................. | 360/123 |
| 5,079,664 | 1/1992 | Miyaguchi ................................. | 360/126 |
| 5,091,810 | 2/1992 | Kakizaki et al. ......................... | 360/103 |
| 5,177,654 | 1/1993 | Matsuzawa et al. ..................... | 360/103 |
| 5,305,516 | 4/1994 | Imazeki et al. .......................... | 29/603 |
| 5,349,487 | 9/1994 | Egawa et al., ........................... | 360/103 |
| 5,359,481 | 10/1994 | Egawa et al. ............................ | 360/103 |
| 5,485,332 | 1/1996 | Egawa et al. ............................ | 360/103 |

FOREIGN PATENT DOCUMENTS

| | | | |
|---|---|---|---|
| 55-146630 | 11/1980 | Japan ........................................ | 360/103 |
| 62-75927 | 4/1987 | Japan . | |
| 63-292413 | 11/1988 | Japan ........................................ | 360/103 |
| 63-292410 | 11/1988 | Japan ........................................ | 360/103 |
| 1-50217 | 2/1989 | Japan ........................................ | 360/103 |
| 1211211 | 8/1989 | Japan ........................................ | 360/103 |
| 1276421 | 11/1989 | Japan ........................................ | 360/103 |
| 3-19119 | 1/1991 | Japan . | |
| 3-34114 | 2/1991 | Japan ........................................ | 360/103 |
| 3-49019 | 3/1991 | Japan . | |
| 3-125320 | 5/1991 | Japan . | |
| 209617 | 9/1991 | Japan ........................................ | 360/103 |
| 3-272004 | 12/1991 | Japan . | |
| 4-3308 | 1/1992 | Japan ........................................ | 360/103 |
| 028010 | 1/1992 | Japan ........................................ | 360/103 |
| 4-222916 | 8/1992 | Japan . | |

*Primary Examiner*—Stuart S. Levy
*Assistant Examiner*—William J. Klimowicz
*Attorney, Agent, or Firm*—Oliff & Berridge

[57] ABSTRACT

A floating magnetic head including a spacer, made from a nonmagnetic substance and which is equal or longer than a head core, is interposed between a slider made from a magnetic substance and the head core. In an alternative embodiment, a part of the slider is made from a nonmagnetic substance and the head core is secured thereon, and coils are wound in opposite senses around core legs of the head core. The present invention shields a noise of an external magnetic field with the slider and improves a recording performance because the slider is isolated magnetically and a magnetic resistance of the slider becomes smaller than that of the head core.

2 Claims, 4 Drawing Sheets

FLOATING MAGNETIC HEAD

This is a continuation of application Ser. No. 08/158,279 filed Nov. 29, 1993, now abandoned.

BACKGROUND OF THE INVENTION

1. Field of the Invention

The present invention relates to a magnetic floating head used in a magnetic disk unit for computers or the like.

2. Description of the Related Art

FIG. 7 shows a composite type floating magnetic head 1 used in a magnetic disk unit for computers. The floating magnetic head 1 has a nearly rectangular slider 2 made from a nonmagnetic substance. Rails (floating surfaces) 3 for generating a floating force are provided on the surface which faces toward a magnetic recording medium, of the slider 2. A groove 5 for winding coils which extends in the direction of width of the slider 2 is created on the trailing end 4 of the slider 2. A slit 6 which extends in the longitudinal direction of the rail 3 is created on a part of one rail 3 on the trailing end 4 side of the slider 2. A head core 9 having a read-write gap 7 on the upper part thereof and around which a coil 8 is wound is inserted inside of the slit 6. In the figure, the reference numeral 10 denotes air inflow ends of the slider 2.

Recently, the tendency toward reduction in size and the increase of recording density of rigid disk drivers is increasing. As a result, the magnetic heads in a drive are easily affected by an external magnetic field generated from a motor or the like for driving a magnetic disk which experts a negative influence on the magnetic head during a read-write process. Although it is necessary to shield the magnetic head from the noise caused by the external magnetic field to solve this problem, no measure has been taken heretofore in the prior art floating magnetic head 1 shown in FIG. 7 to shield it from the aforementioned noise.

Accordingly, it is an object of the present invention to solve the aforementioned problem by providing a floating magnetic head which can be shielded from the noise caused by the external magnetic field.

SUMMARY OF THE INVENTION

In order to achieve the aforementioned goal, according to the present invention, a floating magnetic head in which a head core having a recording and playback gap is provided on a side portion of a nearly rectangular slider made from a magnetic substance and having a floating surface facing to a magnetic recording medium on one surface thereof is characterized in that a spacer made from a non-magnetic substance and longer than the head core is bonded with an adhesive between the slider and the head core in a manner allowing coils to be wound around core portions (i.e., two legs) of the head core. In this case, a notch for storing the spacer may be created on the slider.

The floating magnetic head of the present invention is also characterized in that a portion of the slider bonded with the head core is made from a nonmagnetic substance and the other portion of the slider excepting the aforementioned portion is made from a magnetic substance.

The above and other related objects and features of the present invention will be apparent from a reading of the following description of the disclosure found in the accompanying drawings and the novelty thereof pointed out in the appended claims.

DETAILED DESCRIPTION OF PREFERRED EMBODIMENT

Figure 1:
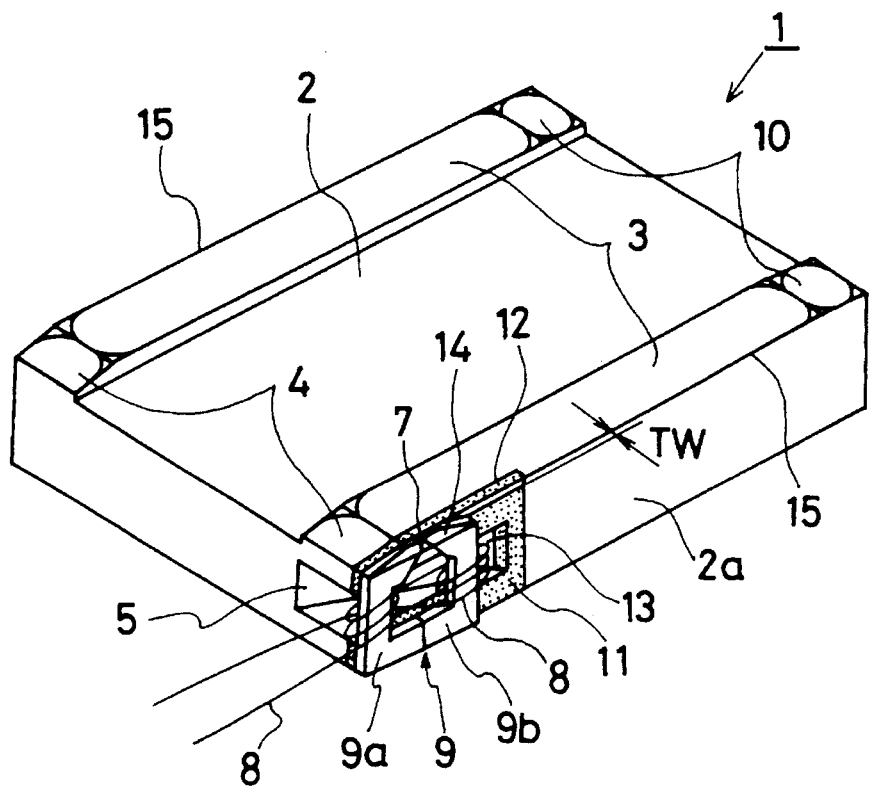
FIG. 1 is a perspective view showing a floating magnetic head according to a first embodiment of the present invention.
Figure 2:
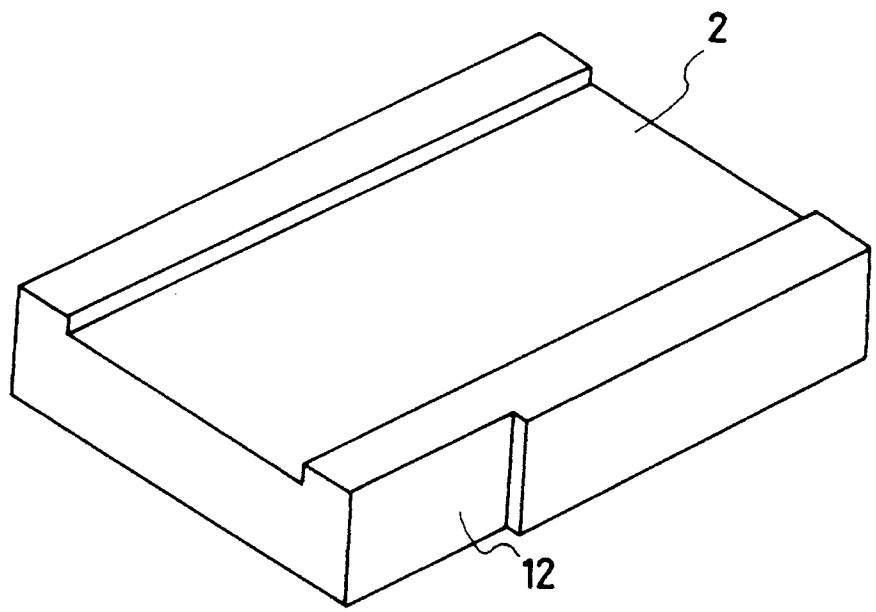
FIG. 2 is a perspective view showing a slider of the floating magnetic head shown in FIG. 1.
Figure 3:
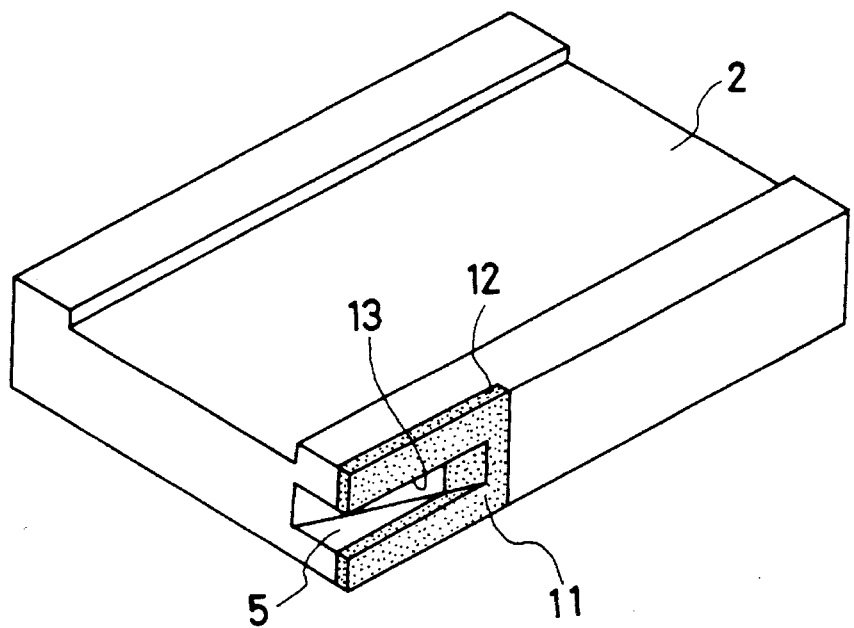
FIG. 3 is a perspective view showing a state wherein a spacer is bonded with the slider.

Referring now to FIGS. 1 through 6, a floating magnetic head of the present invention will be explained in detail. In those drawings, the same reference numerals are designated to the same members or same parts with those shown in FIG. 7 and explanation thereof will be omitted at times. Referring first to FIGS. 1 through 3, a floating magnetic head according to a first embodiment will be explained.

In the figures, the floating magnetic head 1 comprises in outline a nearly rectangular slider 2 made from a magnetic substance such as ferrite and having a floating surface that faces to a magnetic recording medium on one surface thereof, a head core 9 located and provided on a side portion 2a on the side of the trailing end 4 of the slider 2 and having a recording and playback gap 7 and a spacer 11 made from a nonmagnetic substance such as ceramics and bonded with an adhesive between the slider 2 and the head core 9.

A notch 12 for the spacer which is longer than the head core 9 is created on the side portion 2a on the side of trailing end 4 of the slider 2. The spacer 11 which is longer than the head core 9 is stored in the notch 12. In the spacer 11, a spacer side notch 13 which joins with a groove 5 for winding coils created in the slider 2 is created. Coils 8 are wound around core portions 9a and 9b respectively on the trailing end side and on the leading end side of the head core 9 in a manner positioning them around the groove 5 and notch 13. Both coils 8 are connected and wound in opposite senses. The coils 8 are wound so that they do not contact with the slider 2.

The construction of the floating magnetic head 1 will now be explained in detail along with its manufacturing process. At first, the notch 12 for the spacer is created on the side portion 2a on the side of the trailing end 4 of the slider 2 as shown in FIG. 2, the spacer 11 is bonded to this notch 12 by high fusion point glass as shown in FIG. 3 and then the groove 5 for winding coils is created on the trailing end 4 side of one rail 3 of the slider 2 in a manner allowing to wind the coils 8.

Next, the side portion 2a of the slider 2 and the spacer 11 are machined so that they share the same flat surface. At this time, the spacer 11 is machined so that its thickness lies between 0.050 mm and 0.075 mm.

Then the head core 9 fabricated in a different process from that of the slider 2 is bonded with the spacer 11 bonded with the notch 12 of the slider 2 by low fusion point glass or the like. In the present embodiment, they are bonded by forming a glass thin film by a glass sputtering. Due to that, the glass thin film can be very thin. It is possible to create the notch 12 in the slider 2 beforehand and to fill melted glass into the notch 12 to use the filled glass also as a bond for bonding the spacer 11 with the head core 9.

After the bonding, a lapping process is carried out to the rails 3 so that a depth of the read-write gap 7 of the head core 9 is adjusted to a predetermined size and tape lapping is carried out on the floating surface to chamfer edges 15 of the rails of the slider 2.

Then an inclined face 14 is created by diagonally grinding the head core 9 from the side not bonded with the slider 2 to adjust a track width Tw of the head core 9 appearing to the rail 3 to a predetermined size. An area of the nonmagnetic spacer 11 and head core 9 appearing to the rail 3 is very small as compared to that of the magnetic slider 2 appearing to the rail 3.

In the floating magnetic head 1 constructed as described above, the slider 2 is isolated from the head core 9 magnetically because the nonmagnetic spacer 11 is interposed between the slider 2 and the head core 9. Further, a magnetic resistance of the slider 2 is small compared to that of the head core 9 because the slider 2 is made of a magnetic substance an its size is larger than the core. Due to that, a noise from an external magnetic field is shielded by the slider 2 and a recording accuracy of the head can be improved. Furthermore, because the coils 8 are wound to the head core 9 in opposite senses, the external magnetic field can be canceled further.

Because the area a appearing of the nonmagnetic spacer 11 and head core 9 exposed to the rail 3 of slider 2 is very small as compared to that of the rail 3 and because the edge 15 of the slider 2 appearing to the rail 3 is chamfered, the magnetic recording medium will not be damaged by the edge 15 even when it is operated by a CSS (Contact Start Stop) system and thereby the resistance to CSS can be improved.

Further, because the notch 12 for the spacer is created on the slider 2 and the spacer 11 is arranged to be stored in the notch 12, the spacer 11 can be provided without increasing the size of the unit.

Figure 4:
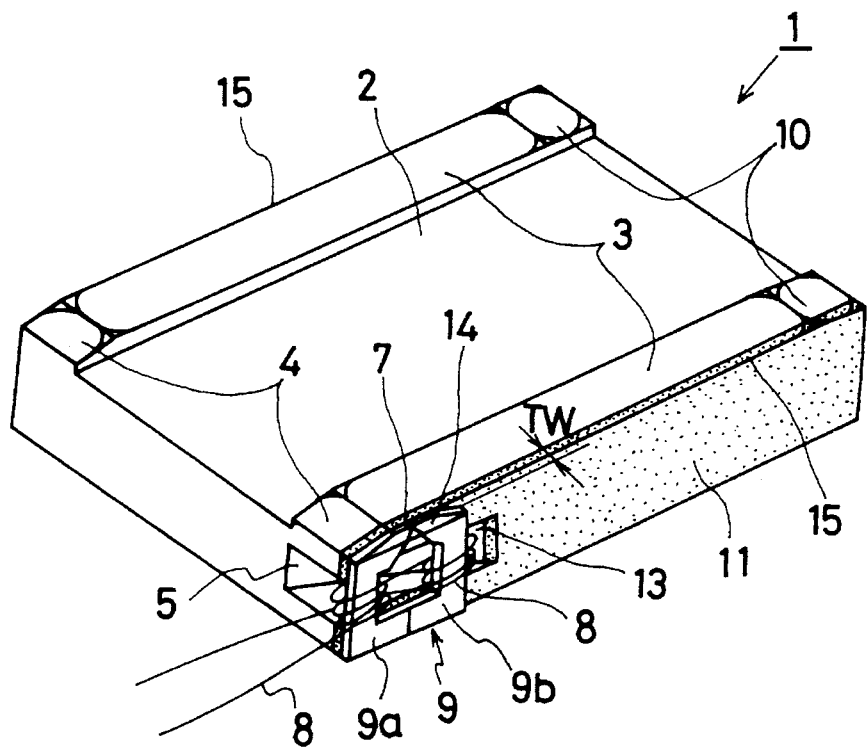
FIG. 4 is a perspective view showing a floating magnetic head according to a second embodiment of the present invention.

FIG. 4 is a perspective view showing the floating magnetic head 1 according to a second embodiment of the present invention. It is constructed by bonding the spacer 11 with the head core 9 beforehand and then by bonding the spacer 11. With the side portion 2a of slider 2. The spacer 11 is fabricated so that its thickness lies between 0.050 mm and 0.075 mm. This floating magnetic head 1 can shield the noise of the external magnetic field with the magnetic slider 2 and because the coil 8 is wound around the legs of head core 9 in the opposite senses and, can cancel the external magnetic field further similarly to the floating magnetic head 1 in the first embodiment described above.

Figure 5:
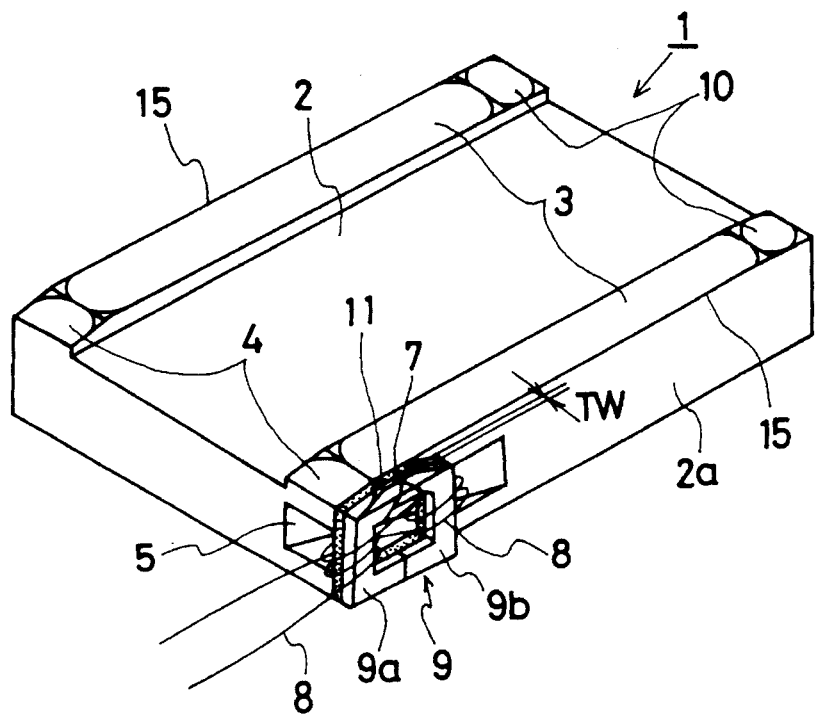
FIG. 5 is a perspective view showing a floating magnetic head according to a third embodiment of the present invention.

FIG. 5 is a perspective view showing the floating magnetic head 1 according to a third embodiment of the present invention. Whereas the slider 2 of the floating magnetic head 1 of the first embodiment has the notch 12 for the spacer, no notch is created on the slider 2 in the floating magnetic head 1 of the third embodiment. It is constructed by bonding the spacer 11 with the head core 9 beforehand and then by bonding the spacer 11 with which the head core 9 has been bonded with the side portion 2a of the slider 2. The spacer 11 is fabricated so that its thickness lies between 0.050 mm and 0.075 mm at this time.

This floating magnetic head 1 can shield the noise of the external magnetic field by the magnetic slider 2 and because the coil 8 is wound around the leg of the head core 9 in opposite senses and, can cancel the external magnetic field further similarly to the floating magnetic head 1 in the first embodiment described above. Furthermore, because the step for creating a notch on the side portion 2a of the slider 2 is eliminated, the production time can be reduced.

Figure 6:
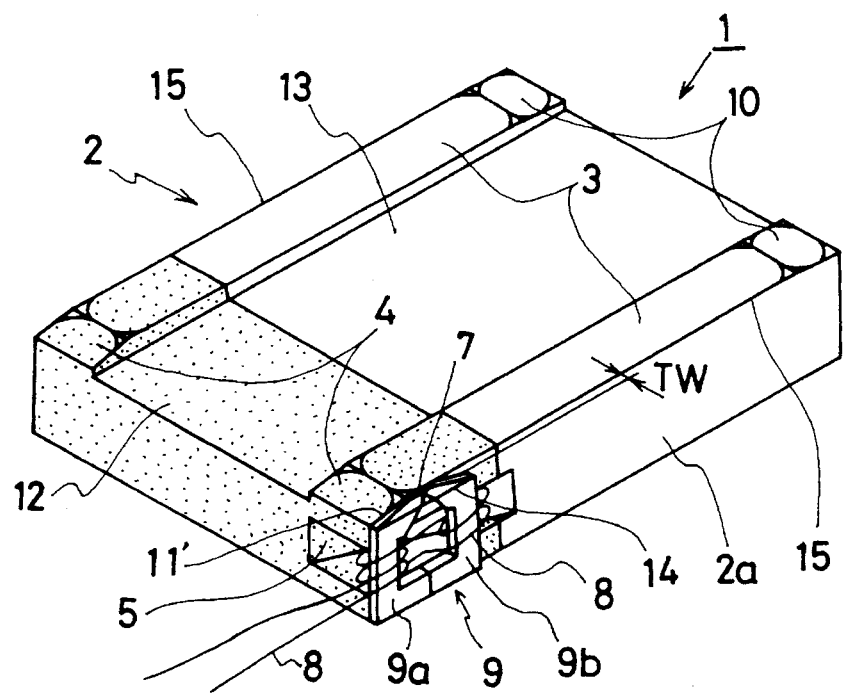
FIG. 6 is a perspective view showing a floating magnetic head according to a fourth embodiment of the present invention.
Figure 7:
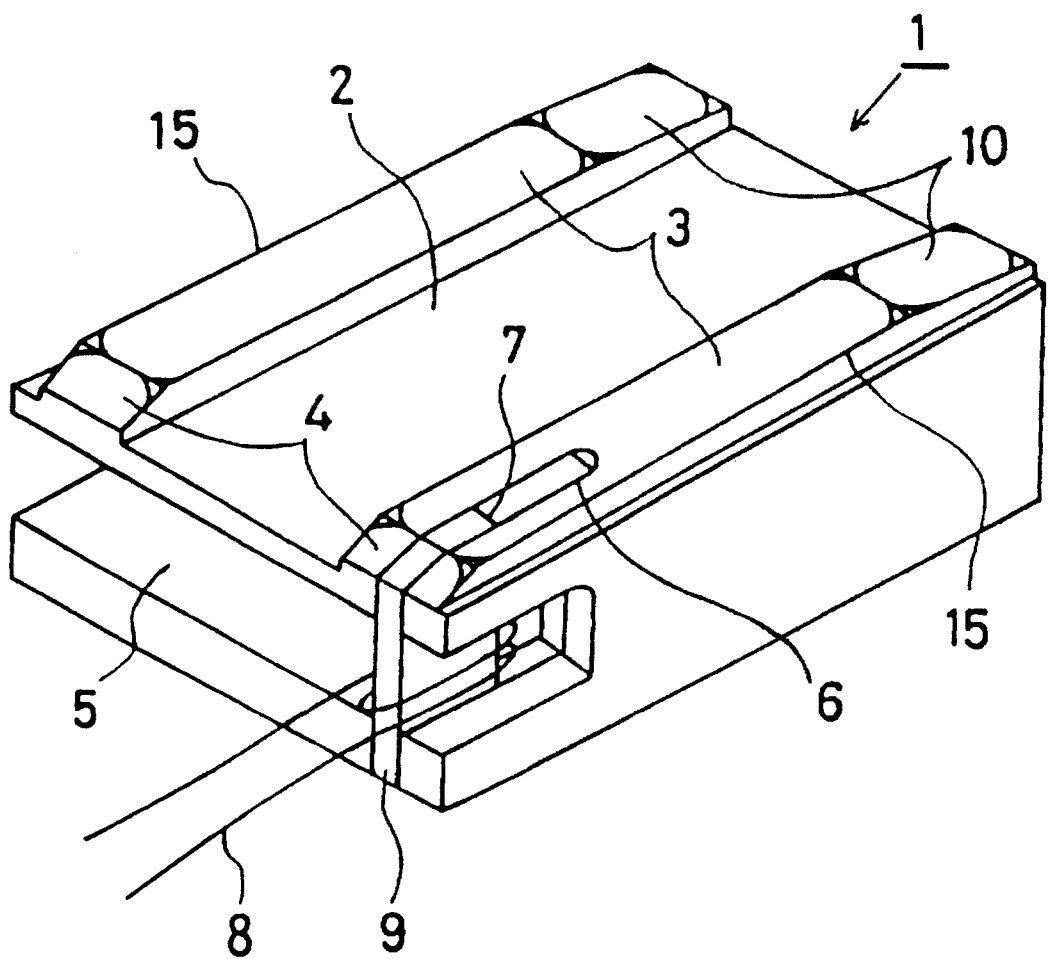
FIG. 7 is a perspective view showing one example of a prior art floating magnetic head.

FIG. 6 is a perspective view showing the floating magnetic head 1 according to a fourth embodiment of the present invention. In the figure, the floating magnetic head 1 comprises a nearly rectangular slider 2 and a head core 9 having a read-write gap 7. The head core 9 is bonded with the side portion 2a of the slider 2 on the side of the trailing end 4. The slider 2 is composed of a first slider block 12 made from a nonmagnetic substance such as ceramics provided in correspondence with a portion 11' bonded with the head core 9 and a second slider block 12' made from a magnetic substance such as ferrite.

The construction of this floating magnetic head 1 will now be explained in detail along its manufacturing process. At first, the first slider block 12 and the second slider block 13 are bonded by high fusion point glass to join them. Then after creating the rails 3 which are to become the floating surface, the aforementioned bonded first and second slider blocks 12 and 13 are cut into a desired slider width to obtain the slider 2. Then, the groove 5 which allows winding of the coil 8 around the core portions 9a and 9b of the head core 9 is created on the side of the trailing end of one rail 3 of the slider 2.

Next the head core 9 fabricated in a different process from that of the slider 2 is bonded with the side portion 2a of the slider 2 by low melting point glass or the like. In the present embodiment, they are bonded by forming a sputtered then glass films. Due to that, the thickness of the bonding layer can be very thin.

After that, lapping is carried out on the rails 3 so that a depth of the recording and playback gap 7 of the head core 9 is adjusted to a predetermined size and tape lapping is carried out on the floating surface to chamfer edges 15 of the rails 3 of the slider 2.

Then an inclined face 14 is created by diagonally grinding the head core 9 from the side not bonded with the slider 2 to adjust a track width Tw of the head core 9 exposed to the rail 3 to a predetermined size (7 micron in the present embodiment). Such machining of the track width Tw of the head core 9 may be carried out using an etching technology such as ion milling.

Because the head core 9 is chamfered from both sides of the leading end and the trailing end and is ground diagonally on the side of the floating surface to the size of the track width Tw, the portion of the head core 9 exposed to the rail 3 is very small.

In the floating magnetic head 1 constructed as described above, a magnetic resistance of the slider 2 is small compared to that of the head core 9 because most of the slider 2, i.e. the second slider block 13, is made from a magnetic substance. Due to that, the noise from the external magnetic field is shielded by the magnetic second slider block 13.

Furthermore, the groove 5 for winding coils is created on the slider 2 on the side of the trailing end 4 of one rail 3 in a manner allowing winding of the coils 8 around core portions 9a and 9b of the head core 9. Both coils 8 are connected and are wound in opposite senses.

By constructing the floating magnetic head as described above, the slider can be isolated magnetically because the nonmagnetic spacer is interposed between the slider and the head core, and a magnetic resistance of the slider can be small as compare to that of the head core because the slider is made from a magnetic substance and its size is larger than the core. The coil can be wound in opposite senses around the core legs of the head core 9 outflow end and air with the spacer interposed between the slider and the head core. The spacer can also be interposed between the slider and the head core and disposed in a notch by creating the notch for storing the spacer on the slider.

Further, because the portion of the slider bonded with the head core is made of a nonmagnetic substance and the other portion of the slider excepting that portion is made of a magnetic substance and because the later portion is made large, most of the slider is dominated by the magnetic substance and its magnetic resistance can be small compared to that of the head core.

While the present invention has been particularly shown and described with reference to preferred embodiments thereof, it will be understood by those skilled in the art that the foregoing and other changes in form and details can be made therein without departing from the spirit and scope of the invention.

What is claimed is:

1. A floating magnetic head comprising:

a substantially rectangular slider made of a magnetic substance and having leading and trailing ends, the slider being provided with a groove which gradually increases in depth along a side of the slider extending toward the trailing end, the groove forming a first opening in the trailing end and a second opening in the side;

rails mounted on a floating surface of the slider which is opposite to a magnetic recording medium to produce a floating force, the floating surface being substantially perpendicular to the side of the slider;

a spacer made from a non-magnetic substance and bonded to an outer surface of the side of the slider with glass;

a head core located on the spacer and having a first leg and a second leg, the second leg being located at the trailing end of the slider without protruding from the trailing end such that the first leg is located between the second leg and the leading end of the slider, the head core having a read/write gap;

a chamfered portion formed in the head core opposite to a bonding surface of the head core to create an inclined surface; and a first coil wound around the first leg in a first sense and a second coil wound around the second leg in a second sense opposite to the first sense, the first and second coils being connected in series, the first coil and the second coil being at least partially in the groove, wherein a length of the spacer measured in a longitudinal direction of the slider is equal to or greater than a length of the head core measured in the longitudinal direction of the slider and a length of the groove measured in the longitudinal direction of the slider is greater than a length of the head core measured in the longitudinal direction of the slider.

2. A floating magnetic head comprising:

a substantially rectangular slider, a first portion of the slider made of a non-magnetic substance and a second portion of the slider made of a magnetic substance, the slider having leading and trailing ends and being provided with a groove which gradually increases in depth along a side of the slider extending toward the trailing end, the groove forming a first opening in the trailing end and a second opening in the side;

rails mounted on a floating surface of the slider which is opposite to a magnetic recording medium to produce a floating force, the floating surface being substantially perpendicular to the side of the slider;

a head core bonded to an outer surface of the first portion of the slider with glass and having first and second legs, the second leg being located at the trailing end of the slider, the first leg being located between the second leg and the leading end of the slider, the head core having a read/write gap, a length of the first portion of the slider measured in a longitudinal direction of the slider being greater than a length of the head core measured in the longitudinal direction of the slider;

a chamfered portion formed in the head core opposite to a bonding surface of the head core to create an inclined surface; and a first coil wound around the first leg in a first sense and a second coil wound around the second leg in a second sense opposite to the first sense, the first and second coils being connected in series and being at least partially in the groove.

* * * * *